Oct. 28, 1947.   G. E. WADSWORTH   2,429,705
DEAD-END CLAMP
Filed Oct. 25, 1943

INVENTOR.
GEORGE EARL WADSWORTH.
BY
Zugelter & Zugelter
Att'ys.

Patented Oct. 28, 1947

2,429,705

UNITED STATES PATENT OFFICE 2,429,705

DEAD-END CLAMP

George Earl Wadsworth, Erlanger, Ky.

Application October 25, 1943, Serial No. 507,654

1 Claim. (Cl. 24—125)

The present invention relates to a dead-end clamp or similar device, the purpose of which is to hold and maintain a wire in a state of tension.

An object of the invention is to provide a dead-end clamp or similar device, incorporating novel means for clamping a wire and holding it under tension without likelihood of the wire to gradually slip from the clamp and thereby lose part of its tension.

Another object of the invention is to provide a clamp of the character referred to, which will not cut or mutilate the outer surface of the wire while holding it in a state of tension, nor will it cause any abrasion or nicking that might reduce the strength of the wire or expose it to premature deterioration by corrosive action.

Another object of the invention is to provide a clamp of the character stated, which is particularly adapted for holding in tension a stranded wire, or one which might tend to cut itself in two due to overlapping of strands, one or more of which might be of harder metal than the remaining strands of the wire.

More specifically, it is an object of this invention to provide a dead-end clamp with a liner or sleeve of soft and permanently deformable material, possessing the characteristic of deforming under pressure and conforming with the contour of a conductor or wire to be clamped.

Another object is to provide an improved clamp of the character referred to, including deformable sleeve or liner elements that may be replaced to advantage in the event that a new grip be necessary upon an existent wire, or upon a replacement wire to be maintained in a state of tension.

The foregoing and other object are attained by the means described herein and disclosed in the accompanying drawing, in which.

Dead-end clamps of one type or another have been in common usage for the purpose of holding and maintaining in a state of tension various types of wires or conductors of electricity. In a typical installation, such clamps included an eye or other expedient adapted for fiixation to a stud of an insulator, or to any other form of support suitable for suspending a wire held by the clamp. The known forms of clamps that have been in common usage, were often found ineffective for maintaining a desired state of tension in the wire or conductor held thereby, failure having been due principally to a tendency of the wire or conductor to gradually recede from the clamp for want of adequate frictional contact between the clamp and the wire or conductor. On the other hand, clamps that were found capable of gripping a wire or conductor with sufficient force, had a tendency to nick or abrade the outer surface of the wire, with the result of decreasing its tensile strength and increasing the liability of the wire to corrode at the point of abrasion. This objection became more pronounced and serious when such clamps were applied to steel or iron core wires having a coating or sleeve of copper welded or otherwise applied to the ferrous core, for the reason that exposure of the ferrous core resulting from nicking, cutting, or abrasion of the copper covering resulted in immediate exposure of the core to the atmosphere, and the setting up of a condition favorable to electrolytic action and corrosion of the wire within the confines of the clamp. This objection was particularly serious in the application of clamp fixtures to stranded transmission wire of the type known as Copperweld, wherein at least one of the strands contained a core of ferrous metal, and was stranded or lapped over the remaining strands of solid copper wire. By improperly clamping wire of that character, or by clamping it too tightly, the harder strand containing the ferrous metal core would invariably cut into the solid copper strands and weaken them at the clamping location. Thus, although the major portion of the wire was sufficiently resistant to tensile strain, failure to withstand the strain would invariably occur at the clamping region where the strands were forced into cutting relationship with one another.

One of the principal objects of the present invention is to eliminate all of the foregoing objections and to preserve the strength and the ability of the wire to withstand tensile strain along its entire length, including the portion thereof gripped by the clamp. Another important advantage of the present clamp is that it will tenaciously grip without nicking, cutting, or abrading any of the strands, and exposing the ferrous metal core to the corrosive action of weather and the other elements of nature.

Figures 1, 2:
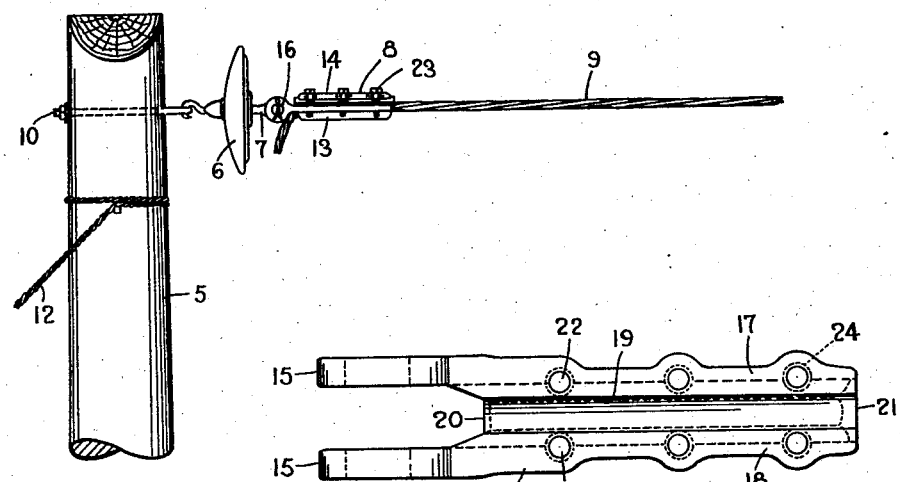
Fig. 1 is an elevational view of a typical installation embodying the improved clamp of the invention.
Fig. 2 is a plan view of the elongated body portion of the clamp.

With reference to the accompanying drawing, Fig. 1 illustrates a dead-end pole 5 to which is suitably anchored an electric insulator 6 having a shank 7 to which the dead-end clamp 8 may be anchored for holding the wire or electric conductor 9 in a state of tension. The application of the insulator to a bolt 10 which passes through the pole, is common practice and may accordingly be illustrated merely as an example of anchoring means for the insulator. The character 12 indicates a guy wire for the pole.

Although the clamp of the invention may be applied to smooth wires or conductors, its greatest advantages are obtained in the clamping of stranded wire as illustrated at 9. For the purpose of clarity of disclosure and understanding, it may be assumed that the wire is made up of several strands, one or more of which is a strength wire formed principally of steel or iron. It is this type of strength wire that has been known to cut through the strands of solid copper wire constituting the conductor. Although this assumption may be adopted in explaining the invention, it should be clearly understood that the nature of the wire or conductor to be clamped is not to constitute a restriction with regard to the clamp 8, which is the real subject of the present invention.

Figures 3, 5:
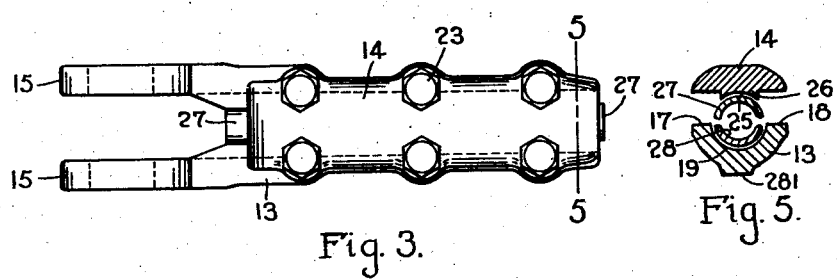
Fig. 3 is a view similar to Fig. 2, showing a cap or clamping section applied to the body portion.
Fig. 5 is a cross section taken on line 5—5 of Fig. 3.

As illustrated by Fig. 3, the clamp is bi-part in construction, consisting of an elongated body portion 13 and an elongated cap or clamping section 14. The body portion without the cap is illustrated by Fig. 2, and will be seen to consist of a casting or forging of metal, preferably brass or bronze, one end of which is bifurcated to present the perforated lugs or eyes 15 which are adapted to receive a pin or the like passing through the shank of the insulator, as indicated at 16 of Fig. 1. At its opposite end, the body portion of the clamp has flat faces 17 and 18 disposed in a common plane, said faces being separated throughout their length by a longitudinal channel 19, the channel being open ended at the locations 20 and 21. At opposite sides of the channel the body portion may be provided with internally threaded holes 22 for the reception of bolts 23 or other fasteners suitable for clamping the cap or clamping section 14 onto the body portion. It will be understood that the cap 14 is furnished with flat surfaces complementary to the surface 17 and 18 of the body portion, and separated by a channel 25 which is complementary to the channel of the body portion, Fig. 2. The series of bolts 23 pass through openings in the cap, and their threaded ends may engage the threads 24 of the body portion holes. Instead of internally threading the holes 22, the holes may be made sufficiently large to loosely receive the threaded ends of the bolts, which in such case would be furnished with nuts screwed onto the ends of the bolts at the underside of the body portion of the clamp.

Figure 4:
Fig. 4 is a perspective view of a liner or sleeve element embodied in the clamp of the invention.

As illustrated by Fig. 5, the channel 25 may be formed upon a rib 26 extending the full length of the cap, said rib being preferably slightly narrower than the width of channel 19 formed in the body portion. The channel of the rib, and the channel of the body portion, are shaped to receive the deformable inserts or liner members 27 and 28, a detail of which is illustrated by Fig. 4. These inserts or liners are formed of soft and permanently deformable material, preferably a metal such as lead, or an alloy including lead or other comparatively malleable metal. The thickness of each insert or liner is such as to reduce the channel diameter to the extent of intimately contacting a conductor or other wire to be clamped, when the clamp body and cap are assembled. As will be evident, the tightening of bolts 33 serves to contract the clamp upon a wire or conductor resting between the half-cylindrical inserts or liners, the latter being adapted to yield in conformity with the contour of the wire or conductor and to receive an impression of any irregularity thereof such as may be present when the wire or conductor is of stranded or braided material. As the strands or braids of the wire sink into and displace portions of the material constituting the inserts or liners, they become firmly seated therein and strongly resist displacement or withdrawal incident to tension applied to the wire or conductor. Under exhaustive tests, wires or conductors held by the clamping device of the invention have been stretched to the breaking point without disassociation of the clamped ends from the clamps. Tests have proven also that stranded wires or conductors anchored by means of the improved clamp, are not subject to crushing or marring within the clamp, and exhibit no tendency for one strand to cut into another although the strands may have different hardness characteristics.

While it is considered preferable to fabricate the inserts or liners from lead or an alloy thereof, the material of which they are constructed may vary, so long as it possesses the necessary characteristics of deformability under pressure, and the necessary frictional holding power. It is conceivable that a non-metallic substance may possess the necessary characteristics stated, so that it will conform with or receive impressions of the contour of a conductor or wire to be clamped, while at the same time frictionally retaining it against slippage relative to the clamp.

It may here be noted that application of the clamping device to a wire or conductor may be effected without removing the cap 14. To insert the wire or conductor, it is necessary only that the bolts be loosened sufficiently to permit reception of the wire or conductor within the space between the bare channels of the clamp, after which the inserts or liners may be slipped endwise along the wire and into the forward end of the clamp the prescribed distance, whereupon the several bolts may be tightened to contract the clamp onto the liners or inserts, which in turn will be forced onto the outer surface of the wire or conductor which, in the presence of sufficient clamping force, will be partially embedded in the material of the opposed liners or inserts. At the same time, the outer or convex surfaces of the liners or inserts will find a secure anchorage within the channels 19 and 25, which channels preferably are permitted to remain unfinished or rough, as the clamp parts are taken from the mold. In other words, it is neither necessary nor desirable to machine the channels or any other parts of the clamp. In the event that slippage of the wire or conductor may be expected, due to its contour or the nature of its constituents, all likelihood of slippage may be avoided by applying to the inserts a suitable frictional substance, for example, a coating of shellac and emery in combination. Under ordinary circumstances, however, the frictional holding power of the liners or inserts constructed of lead or alloys including lead, is ample and will hold the wire or conductor in opposition to torsional forces capable of stretching the wire or conductor to the breaking point.

Figure 6:
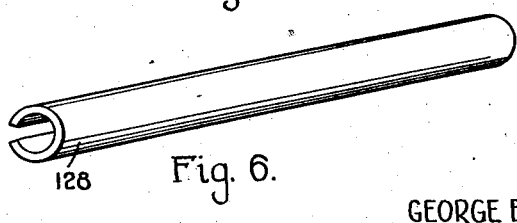
Fig. 6 is a view of a modified form of liner.

The linear or insert 128 illustrated by Fig. 6 may be in all respects similar to the liner assembly previously described, except for the fact that it is of one-piece construction rather than of bi-part construction. As shown, the modified liner comprises merely a split tube that may receive the conductor, whereupon the clamp body may be contracted thereon to grip the conductor as previously explained. The same kinds of material suitable for fabricating the one form of liner, are suitable also for the other form.

The character 28l indicates a longitudinal strengthening rib that extends along the length of the body section 13 beneath its channel 19, said rib performing the same strengthening function as the concave rib 26 formed on the upper section or cap of the clamp.

As illustrated by Fig. 1, the terminal end of the wire or conductor may extend from the rear of the clamp, if desired, inasmuch as the channels and the inserts or liners are open at their opposite ends. If desired, the channels may be knurled or otherwise suitably roughened to increase frictional contact of the insert or liner means therein.

What is claimed is:

A clamp of the character described, comprising in combination, a rigid elongated clamp body having opposite ends, one of which ends is bifurcated and apertured to provide a pair of spaced parallel perforated lugs, the perforations of which are transverse to the length of the clamp body, and aligned with one another, the space between the lugs terminating in a crotch at said one end of the clamp body, said clamp body having a pair of flat coplanar faces extending from the crotch at the one end of the body to the opposite end thereof, said faces each being formed with an elongated channel extending likewise from the crotch to said opposite end, an elongated cap to overlie the channel and the coplanar faces of the clamp body, said cap including a central longitudinally channeled rib and a pair of coplanar flat faces coextensively bounding the length of said rib, the rib of the cap being narrower than the width of the channel of the clamp body, and means for clamping the cap onto the body to force the cap rib toward entry into the body channel to an extent limited by abutment of the coplanar flat faces of the cap and body upon one another.

GEORGE EARL WADSWORTH.

REFERENCES CITED

The following references are of record in the file of this patent:

UNITED STATES PATENTS

| Number | Name | Date |
|---|---|---|
| 1,443,895 | Harris | Jan. 30, 1923 |
| 1,643,110 | Briggs | Sept. 20, 1927 |
| 1,373,590 | Bodmer | Apr. 5, 1921 |
| 1,159,096 | Rigby | Nov. 2, 1915 |
| 1,269,507 | Proctor | June 11, 1918 |
| 2,277,424 | White | Mar. 24, 1942 |

FOREIGN PATENTS

| Number | Country | Date |
|---|---|---|
| 351,062 | Great Britain | June 22, 1931 |